US012598249B2

(12) United States Patent
Mohammed

(10) Patent No.: US 12,598,249 B2
(45) Date of Patent: Apr. 7, 2026

(54) LOW-POWER VOICE AND AUDIO PROCESSING DURING VOICE CALL

(71) Applicant: QUALCOMM Incorporated, San Diego, CA (US)

(72) Inventor: Asif Imroz Mohammed, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 268 days.

(21) Appl. No.: 18/331,327

(22) Filed: Jun. 8, 2023

(65) Prior Publication Data

US 2024/0414264 A1      Dec. 12, 2024

(51) Int. Cl.
*H04M 1/73* (2006.01)
*H04M 3/42* (2006.01)
(52) U.S. Cl.
CPC .............. *H04M 1/73* (2013.01); *H04M 3/42* (2013.01)
(58) Field of Classification Search
CPC ......... H04M 1/73; H04M 3/42; G06F 1/3287; G06F 1/3278
See application file for complete search history.

(56) References Cited

U.S. PATENT DOCUMENTS

| | | |
|---|---|---|
| 2014/0257821 A1 | 9/2014 | Adams et al. |
| 2019/0021054 A1 | 1/2019 | Zhou et al. |
| 2022/0369034 A1 | 11/2022 | Kumar et al. |

OTHER PUBLICATIONS

International Search Report and Written Opinion—PCT/US2024/023795—ISA/EPO—Jul. 26, 2024.

*Primary Examiner* — Mazda Sabouri
(74) *Attorney, Agent, or Firm* — QUALCOMM Incorporated; Espartaco Diaz Hidalgo

(57) ABSTRACT

A device includes an audio processor. The audio processor is configured to, responsive to transitioning from a low-power state to an active state during a voice call, obtain a first audio component from a first audio source and a second audio component from a second audio source. The first audio component corresponds to a user's voice data of the voice call, and the second audio component corresponds to additional audio. The audio processor is configured to generate output audio for transmission during the voice call based on the first audio component and the second audio component. The audio processor is also configured to, after generating the output audio, transition from the active state to the low-power state.

20 Claims, 8 Drawing Sheets

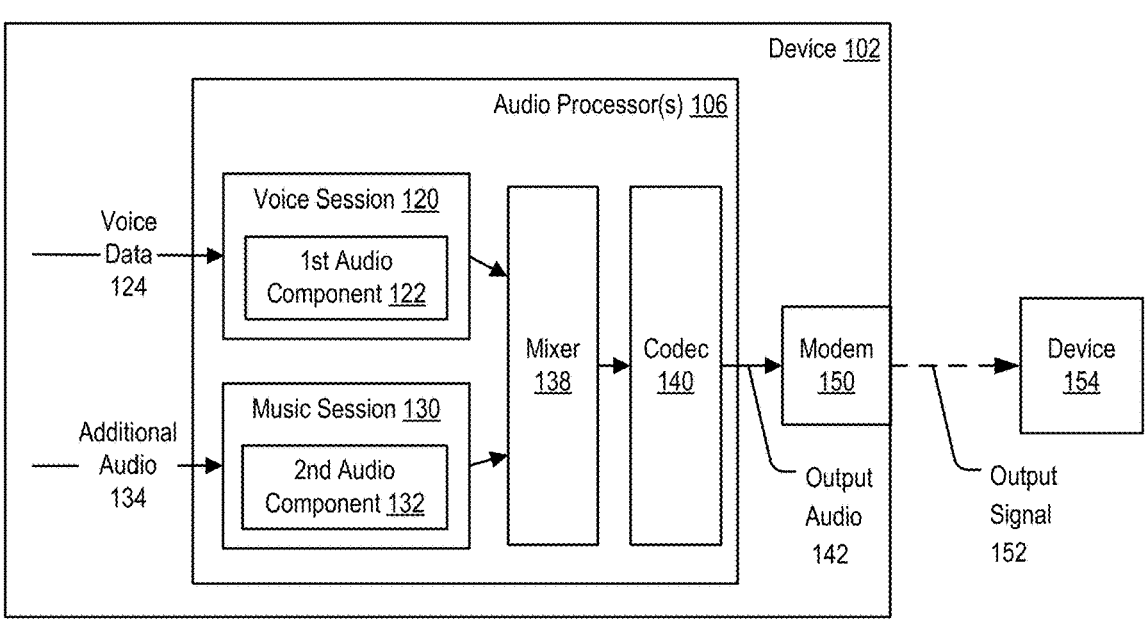
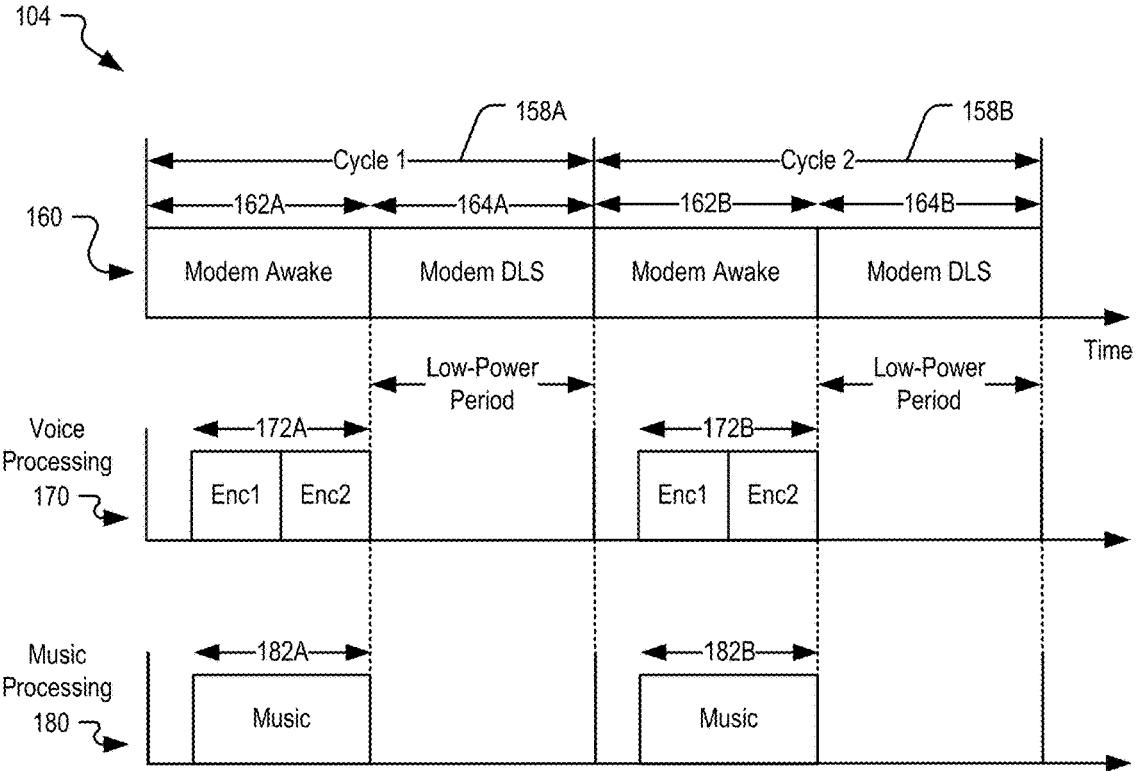
*FIG. 1*

200

Application Processor 206

Additional Audio 134

Pre-recorded Music 260

Pre-recorded Voice Content 262

Modem 150
(e.g., Modem DSP)

Central Sleep Manager 210

Active State 212

LPI State 214

Music Data 234A

Shared Memory 204

Head 252

Tail 254

Circular Buffer 250

Output Audio 142B

Shared Memory 208

Voice Timer 220

Voice Processing Thread(s) 222

Audio Processing Thread(s) 224

Music Data 234B

Output Audio 142A

230

Voice Data 124

Audio Processor(s) 106
(e.g., Audio DSP)

Processor(s) 410

106

Speaker 842

Microphone 230

Microphone 230

Speaker 942

410

Display 946

FIG. 9

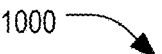

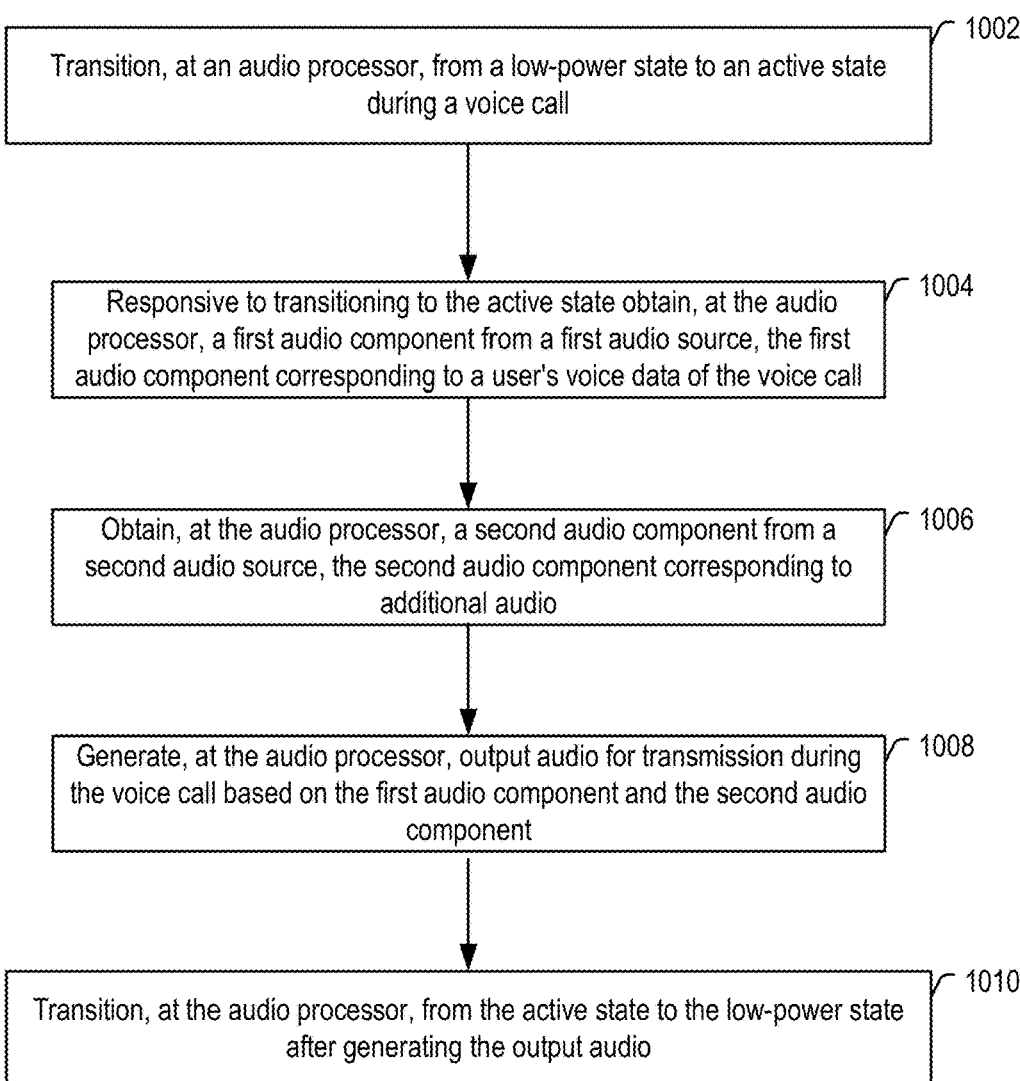

1000

1002
Transition, at an audio processor, from a low-power state to an active state during a voice call 1004
Responsive to transitioning to the active state obtain, at the audio processor, a first audio component from a first audio source, the first audio component corresponding to a user's voice data of the voice call 1006
Obtain, at the audio processor, a second audio component from a second audio source, the second audio component corresponding to additional audio 1008
Generate, at the audio processor, output audio for transmission during the voice call based on the first audio component and the second audio component 1010
Transition, at the audio processor, from the active state to the low-power state after generating the output audio

*FIG. 10*

LOW-POWER VOICE AND AUDIO PROCESSING DURING VOICE CALL

I. FIELD

The present disclosure is generally related to processing voice and other audio for concurrent playout during a voice call.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Such computing devices often incorporate functionality to capture user speech from one or more microphones and encode the user speech for transmission to a remote device during a voice call. In some cases, power consumption associated with the voice call can be reduced by having components associated with the voice call, such as a modem and a processor that encodes the user's speech for transmission, enter a low-power state during periods of the voice call where uplink and downlink communications are not scheduled to occur.

A feature that has recently become popular among users of mobile communication devices allows the users to send pre-recorded music or other pre-recorded audio content to another participant of a voice call. Referred to as in-call music delivery (ICMD), this feature can be used by users to share music with their friends during the call or to play pre-recorded messages during the call. For example, a recipient of a call may elect to have an automated assistant play out pre-recorded questions to the sender of a call such as "what is the call regarding?" that enables the recipient to screen unwanted calls prior to engaging in voice communication with the sender.

However, because audio processing for music playback is often performed using some of the same processing components as are used for voice processing during calls, such audio processing can prevent the processing components from being able to enter the low-power state that would otherwise be available during a voice call. As a result, the use of ICMD can result in higher power consumption during a voice call, which can increase the discharge rate of a battery of a mobile communication device, decrease the usage time of the mobile communication device before having to recharge the battery, and negatively impact a user experience.

III. SUMMARY

According to a particular aspect, a device includes an audio processor. The audio processor is configured to, responsive to transitioning from a low-power state to an active state during a voice call, obtain, from a first audio source, a first audio component corresponding to a user's voice data of the voice call. The audio processor is configured to, responsive to transitioning from the low-power state to the active state during the voice call, obtain, from a second audio source, a second audio component corresponding to additional audio. The audio processor is further configured to generate output audio for transmission during the voice call based on the first audio component and the second audio component. The audio processor is also configured to, after generating the output audio, transition from the active state to the low-power state.

According to a particular aspect, a method includes transitioning, at an audio processor, from a low-power state to an active state during a voice call. The method includes, responsive to transitioning to the active state, obtaining, at the audio processor, a first audio component from a first audio source. The first audio component corresponds to a user's voice data of the voice call. The method includes, responsive to transitioning to the active state, obtaining, at the audio processor, a second audio component from a second audio source. The second audio component corresponds to additional audio. The method also includes generating, at the audio processor, output audio for transmission during the voice call based on the first audio component and the second audio component. The method further includes transitioning, at the audio processor, from the active state to the low-power state after generating the output audio.

According to a particular aspect, a non-transitory computer-readable medium stores instructions that, when executed by an audio processor, causes the audio processor to, responsive to transitioning from a low-power state to an active state during a voice call: obtain, from a first audio source, a first audio component corresponding to a user's voice data of the voice call; obtain, from a second audio source, a second audio component corresponding to additional audio; and generate output audio for transmission during the voice call based on the first audio component and the second audio component. The instructions are further executable by the audio processor to, after generating the output audio, transition from the active state to the low-power state.

According to a particular aspect, an apparatus includes means for transitioning from a low-power state to an active state during a voice call. The apparatus includes means for obtaining, from a first audio source, a first audio component corresponding to a user's voice data of the voice call responsive to transitioning to the active state. The apparatus includes means for obtaining, from a second audio source, a second audio component corresponding to additional audio responsive to transitioning to the active state. The apparatus also includes means for generating output audio for transmission during the voice call based on the first audio component and the second audio component. The apparatus also includes means for transitioning from the active state to the low-power state after generating the output audio.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

FIG. 1 is a diagram that includes a block diagram and a timing diagram of a particular illustrative aspect of a system operable to process voice and other audio for concurrent playout during a voice call, in accordance with some examples of the present disclosure.

FIG. 2 is a diagram of particular aspects of the system of FIG. 1, in accordance with some examples of the present disclosure.

Figures 8, 9:
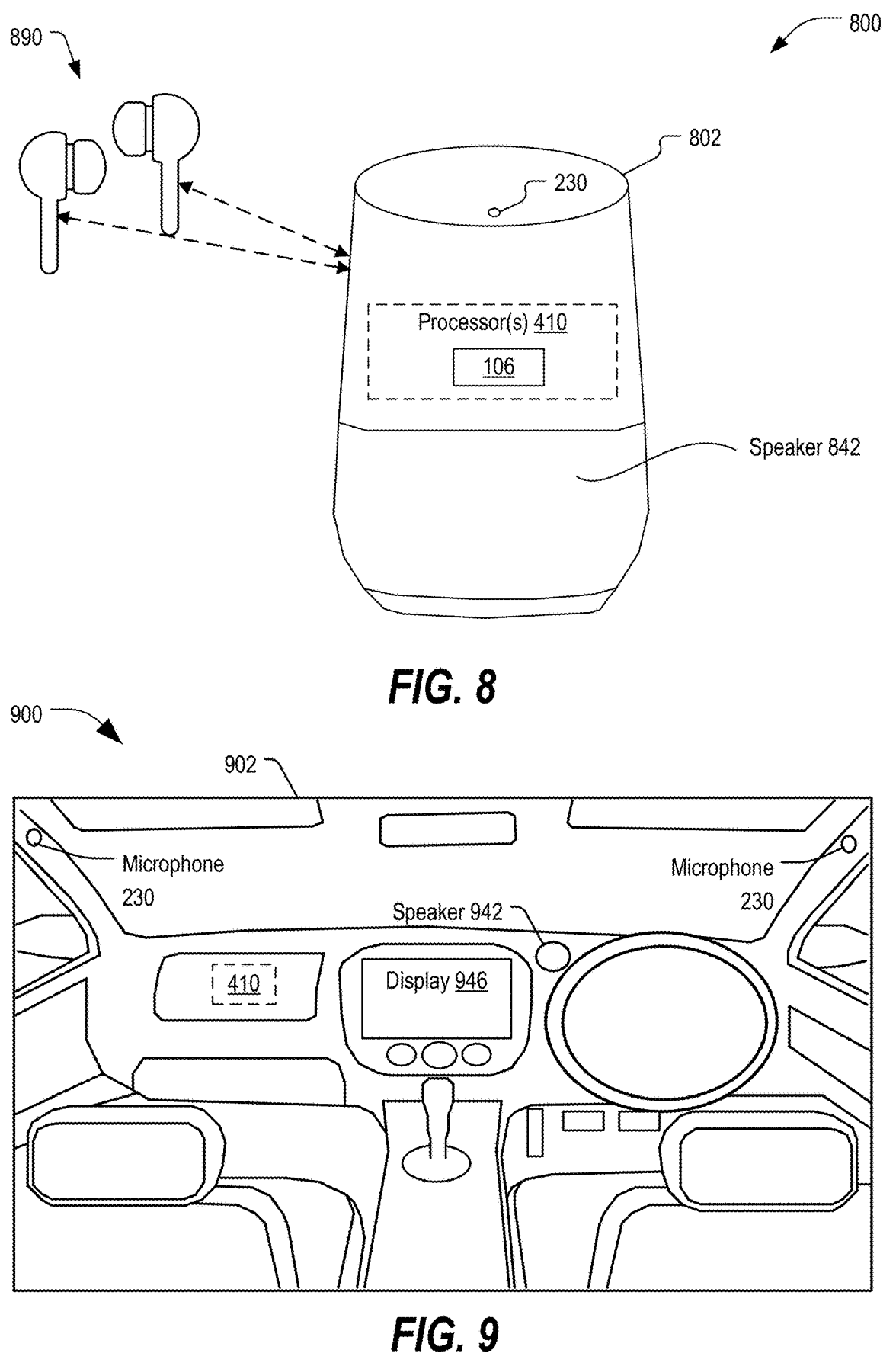

FIG. 8 is a diagram of a voice-controlled speaker system operable to process voice and other audio for concurrent playout during a voice call, in accordance with some examples of the present disclosure.

FIG. 9 is a diagram of a vehicle operable to process voice and other audio for concurrent playout during a voice call, in accordance with some examples of the present disclosure.

FIG. 10 is a diagram of a particular implementation of a method of processing voice and other audio for concurrent playout during a voice call that may be performed by the device of FIG. 1, in accordance with some examples of the present disclosure.

V. DETAILED DESCRIPTION

Figure 3:
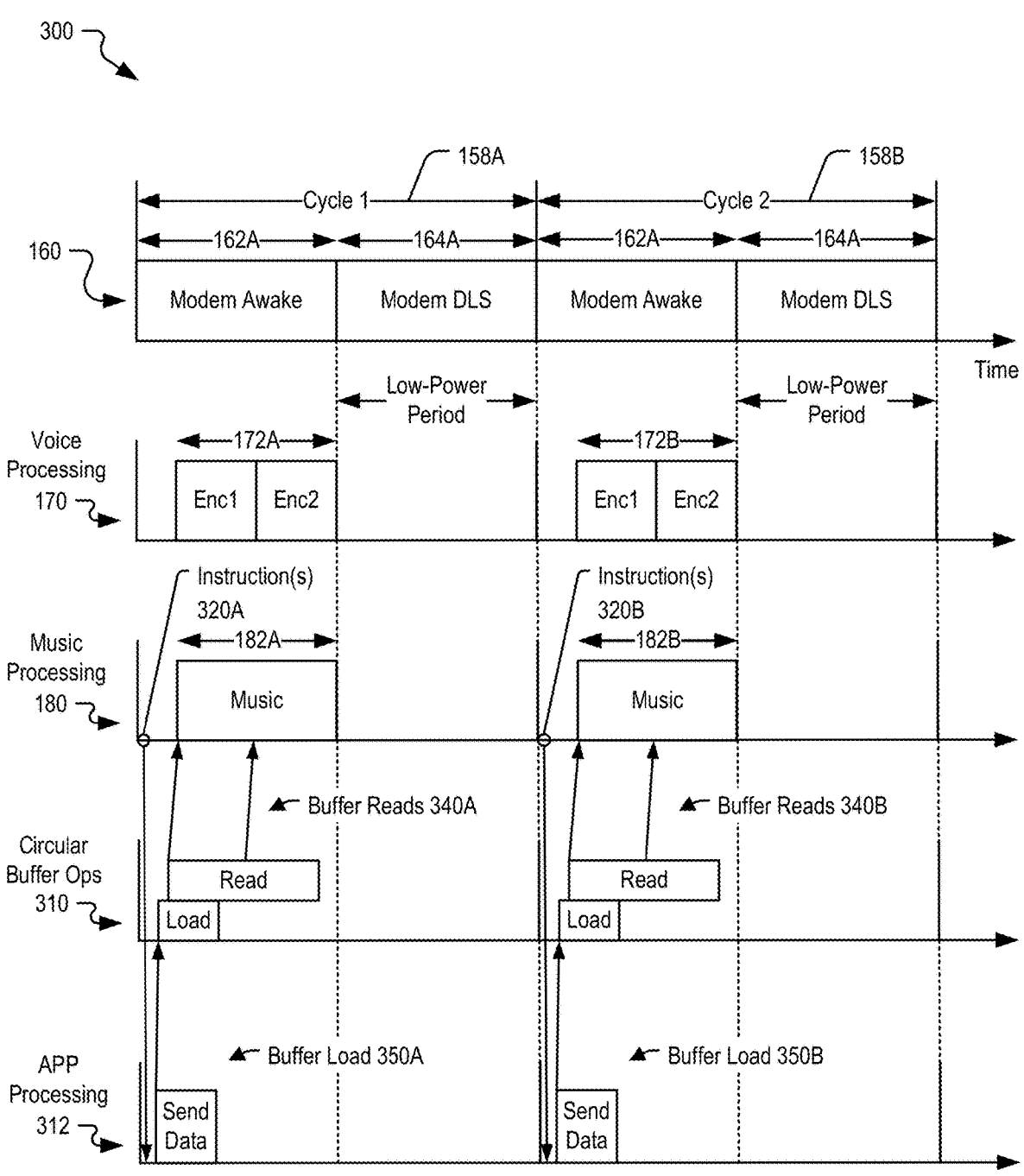
FIG. 3 is a timing diagram illustrating particular aspects of the system of FIG. 1, in accordance with some examples of the present disclosure.

In-call music delivery enables users to provide pre-re-corded music or other audio content to participants during voice calls. However, because audio processing for music playback is often performed using some of the same processing components as are used for voice processing during calls, such audio processing can prevent the processing components from being able to enter the low-power state that would otherwise be available during a voice call. As a result, the use of ICMD can result in higher power consumption during a voice call, which can increase the discharge rate of a battery of a mobile communication device, decrease the usage time of the mobile communication device before having to recharge the battery, and negatively impact a user experience.

Systems and methods of processing voice and other audio for concurrent playout during a voice call are described. For example, according to a particular aspect, operations associated with the processing of music during a voice call for ICMD are temporally aligned with the voice processing operations for the voice call, which enables a communication device (e.g., a mobile phone) to schedule periods during which audio processing components can enter a low-power state, such as a low power island mode, based on call timing criteria. Aligning the voice and music processing operations and entering the low-power state based on the call timing criteria provides the technical advantage of reducing or eliminating the additional power consumption caused by ICMD preventing processing components from entering the low-power state in conventional devices. Thus, the usage time of the communication device between battery charges and the user experience are improved.

In accordance with some aspects, the voice data and music data associated with ICMD are processed at an audio processor, such as a digital signal processor. In some implementations, alignment of processing for a music session with processing for a voice session and with a modem sleep/wake cycle is achieved by having the music session and the voice session subscribe to a static entity, referred to as a voice timer, that is responsible for scheduling threads of both sessions according to voice call timing criteria. As a result, the music session processing and the voice session processing each begin at the same start timestamp for each sleep/wake cycle that is defined by the call timing criteria. In some implementations, a central sleep manager tracks the active/idle duration of all threads running on the audio processor and triggers entry into a low power island mode once all of the threads transition to an idle state, allowing the audio processor to enter a power collapse mode.

In accordance with some aspects, the audio data associated with the music session is received from an application processor via an out-of-band based data exchange via a buffer. Using out-of-band based data exchange prevents the application processor from waking the audio processor from the low-power state for audio data exchange. In a particular implementation, a circular buffer is implemented in a shared memory that enables the application processor to load the audio data to the circular buffer and the audio processor to read the audio data from the circular buffer. The circular buffer can be sized to accommodate multiple cycles worth of audio data, and a watermark event can be raised to the application client when the amount of audio data in the circular buffer falls beneath a threshold, signaling that the circular buffer is to be refilled. According to some aspects, raising of the watermark event is performed by the audio processor at the start of a music processing period.

As a result of using the out-of-band data exchange, transitions of the application processor from a low-power state to an active state to refill the circular buffer can occur relatively infrequently (e.g., once per multiple cycles) and can also be aligned with the modem, music session, and voice session transitions, enabling additional power savings associated with the low power island mode. Thus, the problem arising from conventional command-based buffer exchange in which a command from the application processor wakes the audio processor to read audio data from a buffer and the audio processor sends an acknowledgement back to the application processor is solved by the use of out-of-band based data exchange, providing the technical advantage of enabling audio data transfer from the application processor to the audio processor that does not interrupt the low-power state of the audio processor and that therefore reduces power consumption associated with in-call music delivery.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102 including one or more audio processors ("audio processor(s)" 106 of FIG. 1), which indicates that in some implementations the device 102 includes a single audio processor 106 and in other implementations the device 102 includes multiple audio processors 106. For ease of reference herein, such features are generally introduced as "one or more" features and are subsequently referred to in the singular or optional plural (as indicated by "(s)" in the name of the feature) unless aspects related to multiple of the features are being described.

In some drawings, multiple instances of a particular type of feature are used. Although these features are physically and/or logically distinct, the same reference number is used for each, and the different instances are distinguished by addition of a letter to the reference number. When the features as a group or a type are referred to herein e.g., when no particular one of the features is being referenced, the reference number is used without a distinguishing letter. However, when one particular feature of multiple features of the same type is referred to herein, the reference number is used with the distinguishing letter. For example, referring to FIG. 1, multiple time periods in which a modem is in an active state are illustrated and associated with reference numbers 162A and 162B. When referring to a particular one of these time periods, such as a time period 162A, the distinguishing letter "A" is used. However, when referring to any arbitrary one of these time periods or to these time periods as a group, the reference number 162 is used without a distinguishing letter.

As used herein, the terms "comprise." "comprises," and "comprising" may be used interchangeably with "include." "includes," or "including." Additionally, the term "wherein" may be used interchangeably with "where." As used herein, "exemplary" indicates an example, an implementation, and/ or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled." "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect of a system 100 and a timing diagram 104 associated with processing voice and other audio for concurrent playout during a voice call are shown. In the example illustrated in FIG. 1, the system 100 includes a device 102 configured to process voice data 124 and additional audio 134 for transmission to, and playout at, another device 154 during the voice call. In an illustrative example, the device 154 corresponds to a mobile phone, a headset device, etc., to enable telephonic communication between a user of the device 102 and the device 154 over one or more wired or wireless communication networks (e.g., long-term evolution (LTE), 5G New Radio (NR), etc.) (LTE is a trademark of European Telecommunications Standards Institute).

The device 102 includes one or more audio processors 106 coupled to a modem 150. The audio processor 106 includes a digital signal processor (DSP), one or more other types of processor, or a combination thereof. The audio processor 106 is configured to transition between active and low-power states substantially concurrently with corresponding transitions of the modem 150 that are based on timing criteria associated with the voice call. As a result, power consumption associated with audio processing during the voice call can be reduced.

The audio processor 106 is configured, responsive to transitioning from a low-power state to an active state during the voice call, to obtain a first audio component 122 corresponding to a user's voice data 124 of the call and obtain a second audio component 132 corresponding to additional audio 134. According to an aspect, the first audio component 122 corresponds to one or more frames of the voice data 124 that are received for processing at a voice session 120 of the audio processor 106. In an illustrative implementation, the voice data 124 is received from a first audio source, such as via a microphone that is implemented in or coupled to the device 102. The voice data 124 can be processed for transmission to the device 154 as the voice content of the voice call.

According to an aspect, the second audio component 132 corresponds to one or more frames of the additional audio 134. According to an aspect, the additional audio 134 corresponds to pre-recorded music and is processed at a music session 130 for transmission to the device 154 as music content of the voice call. Although the additional audio 134 is described herein as pre-recorded music content for clarity of explanation, in other implementations the additional audio 134 can instead (or additionally) include pre-recorded voice content or other audio content. In an illustrative implementation, the additional audio 134 is received from a second audio source, such as from an application processor via a shared memory of the device 102, as described further with reference to FIG. 3.

The audio processor 106 is also configured to generate output audio 142 for transmission during the voice call based on the first audio component 122 and the second audio component 132. To illustrate, the audio processor 106 includes a mixer 138 that is configured to mix the first audio component 122 and the second audio component 132 to generate mixed audio data. According to an aspect, the audio processor 106 is further configured to encode the mixed audio data at a codec 140 to generate the output audio 142. After generating the output audio 142, the audio processor 106 is configured to transition from the active state back to the low-power state based on timing criteria associated with the voice call.

The modem 150 is configured to initiate transmission of an output signal 152 based on the output audio 142. In some implementations, the transmission of the output signal 152 including user voice content and additional audio content corresponds to in-call music delivery (ICMD). The modem 150 is also configured to transition between a low-power state and an active state based on the timing criteria associated with the voice call.

The timing diagram 104 illustrates an example of operation of the device 102 in which transitions between an active state and a low-power state of the modem 150 are aligned with the transitions between the active state and the low-power state of the audio processor 106 to enable synchronized processing for the ICMD and power savings using a low power island. The timing diagram 104 depicts modem operations 160, voice processing operations 170, and music processing operations 180 during multiple cycles 158 associated with the voice call, including a first cycle ("cycle 1") 158A and a second cycle ("cycle 2") 158B. In each cycle 158, an awake period 162 indicates a time period in which the modem 150 is in an active state, and a low-power period 164 indicates a time period in which the modem 150 is not active and can enter a low-power state (e.g., a Deep/Light Sleep ("DLS") mode) to conserve power. In a particular implementation, the voice call is a connected mode discontinuous reception (CDRx) call, and timing criteria associated with the cycles 158 (e.g., the length of the awake period 162 and the length of the low-power period 164) are based on a CDRx cycle configuration. In an illustrative, non-limiting example, the duration of each cycle 158 is 40 milliseconds (ms), the duration of the awake period 162 is 20 ms, and the duration of the low-power period 164 is 20 ms. The low-power period 164 having the same duration as the awake period 162 is provided as an illustrative example, in other examples the low-power period 164 can be shorter or longer than the awake period 162 based on a cycle configuration.

The first cycle 158A begins with an awake period 162A, during which the modem 150 and the audio processor 106 transition from a low-power state to an active state. During the awake period 162, the modem 150 performs one or more uplink transmissions, one or more downlink transmissions, or a combination thereof, associated with the voice call. The audio processor 106 performs voice processing operations during a voice processing period 172A, illustrated as a first data loading and encoding operation of a first portion of the voice data 124 ("Enc1") followed by a data loading and encoding operation of a second portion of the voice data 124 ("Enc2"). In an illustrative example, the first and second portions of the voice data 124 each represent 20 ms of voice content and correspond to the first audio component 122. In an example, the first portion of the voice data 124 includes microphone data that was buffered while the audio processor 106 was in the low-power state and retrieved upon the audio processor 106 transitioning to the active state. In an example, the second portion of the voice data 124 includes microphone data that was at least partially buffered subsequent to the audio processor 106 transitioning to the active state. In another example, both the first portion and the second portion can be buffered while the audio processor 106 was in the low-power state. In yet another example, both the first portion and the second portion can be added to the buffer subsequent to the audio processor 106 transitioning to the active state. To illustrate, the audio processor 106 can retrieve portions of the voice data 124 that are being written to the buffer in the active state, that have previously been written to the buffer in the low-power state, or a combination thereof. Although two encoding operations are depicted, it should be understood that fewer than two or more than two encoding operations may be performed during the voice processing period 172A, one or more decoding operations for voice call data received via the modem 150 can be performed during the voice processing period 172A, or any combination thereof.

The audio processor 106 also processes portions of the additional audio 134 during a music processing period 182A of the awake period 162A. To illustrate, the audio processor 106 can load a first portion of the additional audio 134 (e.g., the second audio component 132) from a circular buffer of a shared memory in response to the audio processor 106 transitioning from the low-power state to the active state, as described in further detail with reference to FIG. 2.

The device 102 thus performs voice data retrieval, music data retrieval, mixing, and encoding to generate the output audio 142 at the audio processor 106, and also performs transmission of the output signal 152 via the modem 150, during the awake period 162A. Upon completion of the awake period 162A, the modem 150 and the audio processor 106 halt operations and enter a low-power state during a low-power period 164A. To illustrate, the modem 150 ceases uplink and downlink activity and transitions to a sleep mode (or other low-power state) for the remainder of the first cycle 158A, and the audio processor 106 ceases processing of the voice data 124 and the additional audio 134 and transitions to a low-power state for the remainder of the first cycle 158A.

Upon completion of the low-power period 164A of the first cycle 158A, the second cycle 158B commences with an awake period 162B, during which the modem 150 and the audio processor 106 each transition from a low-power state to an active state. During the awake period 162B, the modem 150 resumes uplink and/or downlink activity associated with the voice call, and the audio processor 106 resumes processing of the voice data 124 and the additional audio 134 to generate a next set of output audio 142 for transmission to the device 154 via the modem 150.

To illustrate, the audio processor 106 performs voice processing operations 170 during a voice processing period 172B of the awake period 162B, illustrated as a first data loading and encoding operation of a third portion of the voice data 124 ("Enc1") followed by a second data loading and encoding operation of a fourth portion of the voice data 124 ("Enc2"). In an example, the third portion of the voice data 124 includes microphone data that was buffered during the low-power period 164A and retrieved upon the audio processor 106 transitioning to the active state.

The audio processor 106 also processes portions of the additional audio 134 during a music processing period 182B of the awake period 162B. To illustrate, the audio processor 106 can load a second portion of the additional audio 134 from a circular buffer of a shared memory in response to the audio processor 106 transitioning from the low-power state to the active state, as described in further detail with reference to FIG. 2. During the awake period 162B, in response to detecting that the data in the buffer is less than a threshold, the audio processor 106 may also instruct an application processor to refill the circular buffer with audio data during the awake period 162B.

Upon completion of the awake period 162B, the modem 150 and the audio processor 106 halt operations and enter a low-power state during a low-power period 164B. To illustrate, the modem 150 ceases uplink and downlink activity and transitions to a sleep mode (or other low-power state) for the remainder of the second cycle 158B, and the audio processor 106 ceases processing of the voice data 124 and the additional audio 134 and transitions to a low-power state for the remainder of the second cycle 158B.

As described further with reference to FIG. 2, synchronization of the music processing operations 180 with the modem operations 160 and the voice processing operations 170 can be performed using a voice timer to schedule voice processing threads at the audio processor 106 as well as to schedule audio processing threads for the additional audio 134 according to timing criteria of the voice call. A central sleep manager can be configured to trigger entry into a low power island state in response to detecting that the voice processing threads and the audio processing threads are idle.

By aligning the voice processing operations 170 associated with the voice session 120 and the music processing operations 180 associated with the music processing operations 180, the audio processor 106 can enter the low-power state during the low-power periods 164 associated with the sleep/wake cycle of the modem 150 and defined by the call timing criteria. As a result, power consumption of the audio processor 106 when providing ICMD is reduced as compared to conventional systems in which entry into the low-power state is prevented by music processing periods that are not aligned with voice processing periods.

FIG. 2 is a diagram of particular aspects of the system of FIG. 1, in accordance with some examples of the present disclosure. In particular, FIG. 2 highlights an example of components 200 that can be implemented in the device 102, according to a particular implementation. In the example illustrated in FIG. 2, the components 200 include the audio processor 106 (e.g., an audio DSP), the modem 150 (e.g., a modem DSP), a shared memory 204, an application processor 206, a shared memory 208, a central sleep manager 210, a voice timer 220, and a microphone 230.

According to some aspects, the application processor 206 corresponds to a processor configured to execute client applications. In particular, the application processor 206 is configured to provide the additional audio 134 of FIG. 1, illustrated as music data 234, to the audio processor 106 via the shared memory 204. As illustrated, the additional audio 134 can include pre-recorded music 260, pre-recorded voice content 262, or a combination thereof. For example, the additional audio 134 can be retrieved from one or more audio files via a user-selected music playback application. In other implementations, at least a portion of the additional audio 134 may be generated by a game engine or other audio generation application executed at the application processor 206.

The shared memory 204 corresponds to one or more memory devices that is accessible to the application processor 206 and the audio processor 106 to enable exchange of data between the application processor 206 and the audio processor 106. The shared memory 204 includes a circular buffer 250 to store the music data 234 for retrieval by the audio processor 106. To illustrate, the circular buffer 250 can include a dedicated portion of the shared memory 204 (e.g., a single contiguous portion or a combination of multiple portions) and identifiers of (e.g., pointers to) a head 252 and a tail 254 of data stored in the circular buffer 250. The head 252 corresponds to the location of the oldest data in the circular buffer 250, which is next to be read from the circular buffer 250 in a first-in-first-out (FIFO) configuration. The tail 254 corresponds to the location of the most recently added data in the circular buffer 250 and/or the location where new data is to be added to the circular buffer 250. It should be understood that although the circular buffer 250 is illustrated as a circular array of memory locations and referred to as "circular," such description is used because the circular buffer 250 uses a single, fixed-size buffer as if it were connected end-to-end, and the term "circular" does not refer to or imply any particular physical shape of the buffer or of the storage elements included in the buffer.

Music data 234A that is loaded from the application processor 206 is added at the tail 254 of the circular buffer 250, and the indicator of the tail 254 is updated to indicate the new location of the tail 254 of the data stored in the circular buffer 250. Similarly, when music data 234B is read from the circular buffer 250 by the audio processor 106, the indicator of the head 252 is updated to indicate the location of the next data to be read from the circular buffer 250.

The shared memory 208 corresponds to one or more memory devices that is accessible to the application processor 206 and the modem 150 to enable exchange of data between application processor 206 and the modem 150. The shared memory 208 may optionally include a buffer to store output audio 142 for retrieval by the audio processor 106 in a FIFO configuration, such as a circular buffer similar to the circular buffer 250 as an illustrative, non-limiting example. Although the shared memory 208 is illustrated as distinct from the shared memory 204, in other implementations the shared memory 204 and the shared memory 208 may be implemented via a single shared memory that is accessible to the audio processor 106, the application processor 206, and the modem 150.

The audio processor 106 operates substantially as described with reference to FIG. 1. In particular, the audio processor 106 is configured to obtain the first audio component 122 of the voice data 124 received from the microphone 230 (e.g., one or more microphones that are integrated in, or coupled to, the device 102). The audio processor 106 is also configured to obtain the second audio component 132 from the circular buffer 250, such as by sending a command to read the second audio component 132 from the head 252 of the circular buffer 250, which is received at the audio processor 106 as music data 234B. The audio processor 106 processes the voice data 124 and the music data 234B (e.g., via mixing and encoding) to generate output audio 142A that is sent to the shared memory 208 to be accessible to the modem 150.

As described further with reference to FIG. 3, the audio processor 106 is also configured to instruct the application processor 206 to refill the circular buffer 250 with audio data corresponding to the additional audio 134. In an illustrative implementation, the audio processor 106 is configured to compare an amount of the additional audio 134 stored in the circular buffer 250 and, based on comparing the amount of stored additional audio 134 to a threshold, send an instruction to the application processor 206 to refill the circular buffer 250 partially or completely. According to an aspect, the instruction corresponds to a watermark event that indicates to the application processor 206 the address of the tail 254 and the size of the data remaining in the circular buffer 250. To illustrate, the circular buffer 250 may have a 1 megabyte (MB) capacity, and the audio processor 106 may instruct the refilling of the circular buffer 250 when the amount of data remaining in the circular buffer 250 falls below a threshold amount (e.g., 100 kilobytes (kB)), as an illustrative, non-limiting example. Because the application processor 206 can refill the circular buffer 250 at a much faster rate than the audio processor 106 reads the music data 234B from the circular buffer 250, and because the circular buffer 250 can be sized to store an amount of the additional audio 134 sufficient for multiple cycles 158 of the voice call, the application processor 206 may only need to refill the circular buffer 250 once per several cycles 158 of the voice call (e.g., one refill per 10 cycles of the voice call, as an illustrative, non-limiting example).

The modem 150 operates substantially as described with reference to FIG. 1. In particular, the modem 150 is configured to retrieve the output audio 142 from the shared memory 208 for processing to generate the output signal 152. To illustrate, the audio processor 106 may send the output audio 142A to the shared memory 208 for storage at a buffer of the shared memory 208, and the modem 150 may retrieve the buffered output audio 142B from the buffer of the shared memory 208.

The voice timer 220 is configured to schedule voice processing threads 222 and audio processing threads 224 for the additional audio according to timing criteria of the voice call, such as timing criteria based on a CDRx cycle configuration. For example, the voice timer 220 is configured to schedule the voice processing threads 222 at the audio processor 106 (e.g., corresponding to the voice session 120) based on timing criteria associated with the voice call so that none of the voice processing threads 222 associated with the voice processing operations 170 are operative during the low-power periods 164. In addition to scheduling the voice processing thread(s) 222, the voice timer 220 schedules the audio processing threads 224 at the audio processor 106 based on the timing criteria associated with the voice call so that none of the audio processing threads 224 associated with the music processing operations 180 are operative during the low-power periods 164. To illustrate, the voice timer 220 can correspond to a software thread of the audio processor 106 that assigns resources, such as clocks and memory bandwidth, to the various subscribed threads so that resources are allocated to the voice processing threads 222 and the audio processing threads 224 during the awake periods 162 and deallocated from the voice processing threads 222 and the audio processing threads 224 during the low-power periods 164.

The central sleep manager 210 is configured to track processing threads at the audio processor 106 and control transitions of the audio processor 106 between an active state 212 and a low power island state 214. In a particular example, the central sleep manager 210 corresponds to a duty cycle manager and is configured to trigger entry into a low power island state 214 in response to detecting that the voice processing threads 222 and the audio processing threads 224 are idle. Similarly, if not in use servicing other applications, the application processor 206, the shared memory 204, or both, can also be transitioned to a low power state during the low-power periods 164, and the shared memory 208 can be transitioned to a low power state when audio processor 108 and the modem 150 are in the low power state and the shared memory 208 is not otherwise in use.

By using the voice timer 220 to schedule the voice processing threads 222 and the audio processing threads 224, the voice timer 220 can ensure that all of the voice processing threads 222 and the audio processing threads 224 are idle at the audio processor 106 during the low-power periods 164, enabling the central sleep manager 210 to trigger entry into the low power island state 214 and resulting in power savings. In addition, as compared to command-based buffer exchange, using the circular buffer 250 of the shared memory 204 with out-of-band signaling to provide the stored additional audio 134 from the application processor 206 to the audio processor 106 enables the audio processor 106 to retrieve audio data (and the application processor 206 to replace consumed data) without waking the audio processor 106 during the low-power periods 164.

FIG. 3 is a timing diagram 300 illustrating particular aspects of operation of the components 200, in accordance with some examples of the present disclosure. In particular, the timing diagram 300 depicts the modem operations 160, the voice processing operations 170, and the music processing operations 180 of FIG. 1. The timing diagram 300 also includes circular buffer operations 310 associated with the circular buffer 250 and application processor operations 312 associated with the application processor 206.

As illustrated, the audio processor 106 is configured to send instructions 320 to the application processor 206 following the transitioning of the audio processor 106 from the low-power state to the active state. The instructions 320 instruct the audio processor 106 to refill (e.g., partially or completely) the circular buffer 250 with audio data (e.g., the music data 234A) corresponding to the additional audio 134. For example, following transitioning from the low power island state 214 to the active state 212 during the first cycle 158A, the audio processor 106 may determine that the circular buffer 250 does not have sufficient data for the music processing to be performed during the first cycle 158A. To illustrate, the audio processor 106 may determine, based on the distance (e.g., number of memory blocks) between the head 252 and the tail 254, that the circular buffer 250 stores less than a threshold amount of audio data, and in response to the determination, sends one or more instructions 320A to the application processor 206.

The application processor 206 is configured to refill the circular buffer 250 during the active state responsive to receiving the instructions 320. For example, in some implementations, transitions of the application processor 206 between an active state and a low-power state are aligned with the transitions of the audio processor 106 between the active state and the low-power state. Thus, the application processor 206 is in the active state when the instruction 320A is received. In response to receiving the instruction 320A, the application processor 206 performs a buffer load operation 350A that loads a portion of the additional audio 134 to the circular buffer 250 as music data 234A. In other implementations, however, the application processor 206 may not automatically transition to the active state with the audio processor 106 and may instead remain in the low power state at the start of the cycle 158A. In such implementations, the instruction 320A may cause the application processor 206 to transition to the active state and commence the buffer load operation 350.

After the buffer load operation 350A has loaded a sufficient amount of audio data to the circular buffer 250, the audio processor 106 performs one or more buffer read operations 340A to obtain audio data from the circular buffer 250. The audio processor 106 performs music processing operations 180 to process portions of the audio data from the circular buffer 250 in conjunction with performing voice processing operations 170 to process portions of the voice data 124 from the microphone 230, as described with reference to FIG. 1.

Upon completion of the awake period 162A, the modem 150 and the audio processor 106 halt operations and enter an idle state, and the central sleep manager 210 initiates the transition from the active state 212 to the low power island state 214 during the low-power period 164A. According to some aspects, the modem 150 ceases uplink and downlink activity and transitions to a sleep mode (or other low-power state) for the remainder of the first cycle 158A, and the audio processor 106 ceases processing of the voice data 124 and the additional audio 134 and transitions to a low-power state for the remainder of the first cycle 158A. In addition, according to some aspects, the application processor 206, the shared memory 204, the shared memory 208, or a combination thereof, also transition to a low-power state upon completion of the awake period 162A. For example, in cases where the application processor 206, the shared memory 204 are not supporting any other applications that not associated with the voice call, both of the application processor 206 and the shared memory 204 can enter the low-power state.

Upon completion of the low-power period 164A of the first cycle 158A, the second cycle 158B commences with an awake period 162B, during which the central sleep manager 210 transitions the audio processor 106 from the low power island state 214 to the active state 212. If the shared memory 204 was in a low power state, the shared memory 204 also transitions to the active state. Similarly, if the shared memory 208 was in a low power state, the shared memory 208 also transitions to the active state. In some implementations, if the application processor 206 was in a low power state, the application processor 206 transitions to the active state upon start of the awake period 162B, while in other implementations the application processor 206 remains in the low power state until receiving another instruction 320B.

During the awake period 162B, the audio processor 106 again checks whether the circular buffer 250 includes sufficient audio data. In response to determining that the circular buffer 250 is to be refilled, the audio processor 106 sends one or more instructions 320B to the application processor 206 to trigger a buffer load operation 350B. The audio processor 106 obtains another portion of the additional audio 134 via one or more buffer reads 340B of the circular buffer 250 for processing during the music processing period 182B and another portion of the voice data 124 for processing during the voice processing period 172B. Also during the awake period 162B, the modem 150 also resumes uplink and/or downlink activity associated with the voice call.

Upon completion of the awake period 162B, the modem 150 and the audio processor 106, and optionally the application processor 206, the shared memory 204, and the shared memory 208 halt operations and enter an idle state and the central sleep manager 210 may initiate transition from the active state 212 to the low power island state 214 during the low-power period 164B in a similar manner as described for the low-power period 164A.

Although the timing diagram 300 depicts the application processor 206 performing the buffer load operations 350 during successive cycles 158, in other implementations a single buffer load operation 350 loads sufficient audio data to the circular buffer 250 in a faster than real-time operation to accommodate many cycles 158 worth of the audio data. In such implementations, buffer load operations 350 would not occur in successive cycles 158.

Although the timing diagram 300 depicts the instructions 320 being sent at the beginning of the awake periods 162, the instructions 320 may be generated at any time during the awake period 162. For example, the amount of audio data in the circular buffer 250 may fall beneath a threshold amount toward the end of an awake period 162 as a result of one or more buffer read operations 340 during the awake period 162. In this example, the audio processor 106 can send a corresponding instruction 320 near the end of the awake period 162 that will trigger a buffer load operation 350 at the end of the awake period 162 of the current cycle 158, at the beginning of the awake period 162 of the next cycle 158, or both.

Figure 4:
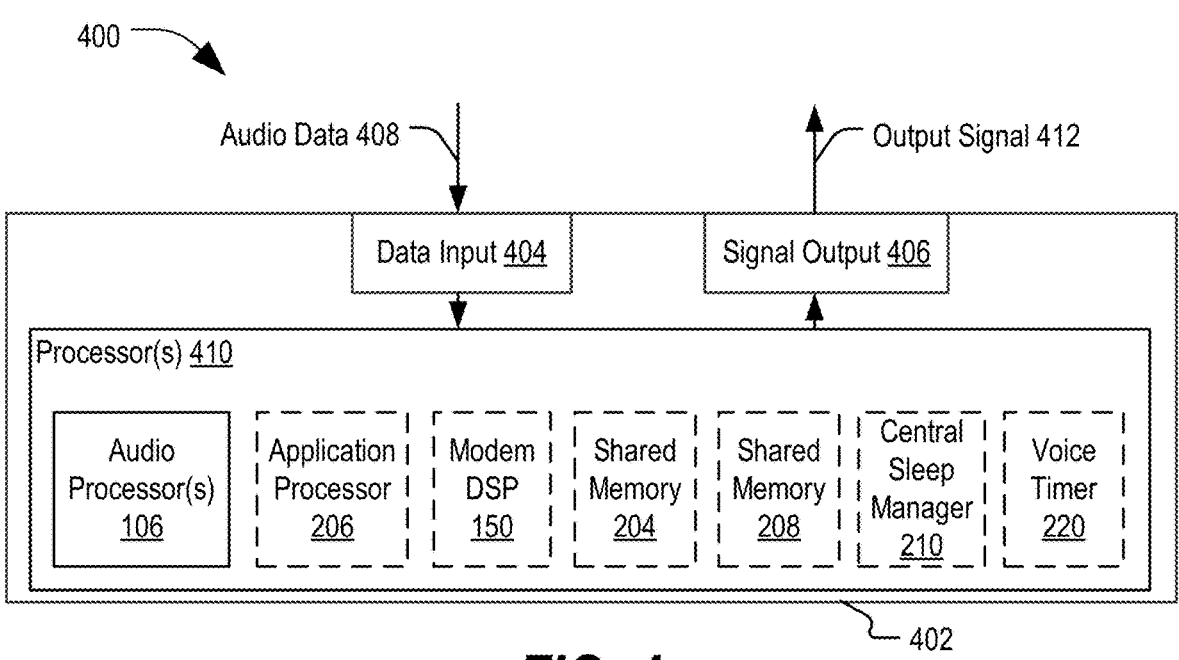
FIG. 4 illustrates an example of an integrated circuit operable to process voice and other audio for concurrent playout during a voice call, in accordance with some examples of the present disclosure.

FIG. 4 depicts an implementation 400 of the device 102 as an integrated circuit 402 that includes one or more processors 410. The one or more processors 410 include the audio processor 106 and optionally include one or more of the application processor 206, the modem 150, the shared memory 204, the shared memory 208, the central sleep manager 210, and the voice timer 220. The integrated circuit 402 also includes a data input 404, such as one or more microphone inputs and/or bus interfaces, to enable audio data 408 to be received for processing. To illustrate, the audio data 408 can correspond to the voice data 124, the additional audio 134, or both, as illustrative, non-limiting examples. The integrated circuit 402 also includes a signal output 406, such as a bus interface, to enable sending of an output signal 412, such as the output audio 142 or the output signal 152, as illustrative, non-limiting examples. The integrated circuit 402 enables the audio processor 106 to be integrated (e.g., included as a component) in a system that includes microphones, such as a mobile phone or tablet computer device as depicted in FIG. 5, a headset device that includes a microphone configured to provide the voice data 124, as depicted in FIG. 6, a wearable electronic device as depicted in FIG. 7, a voice-controlled speaker system as depicted in FIG. 8, or a vehicle as depicted in FIG. 9.

Figure 5:
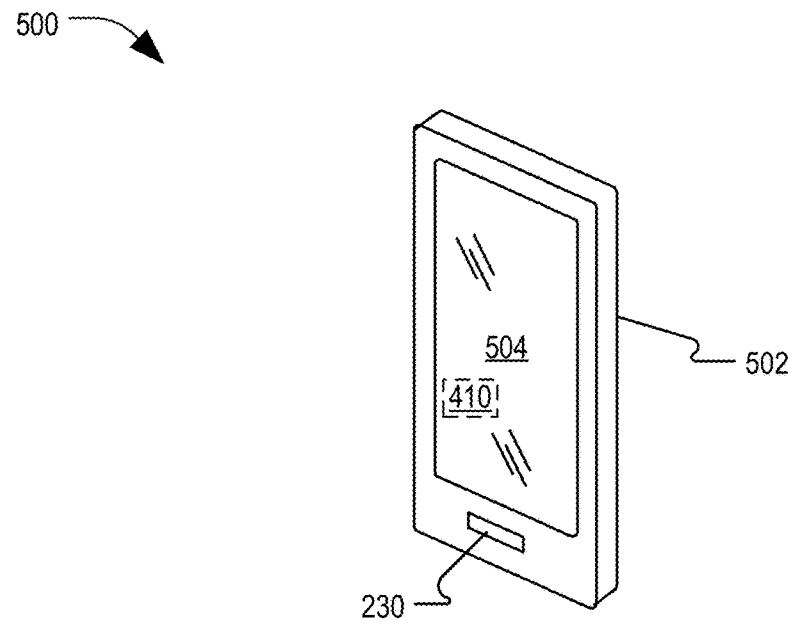
FIG. 5 is a diagram of a mobile device operable to process voice and other audio for concurrent playout during a voice call, in accordance with some examples of the present disclosure.

FIG. 5 depicts an implementation 500 in which the device 102 includes a mobile device 502, such as a phone or tablet computer device, as illustrative, non-limiting examples. The mobile device 502 includes the microphone 230 and a display screen 504. The one or more processors 410 including the audio processor 106 are integrated in the mobile device 502 and are illustrated using dashed lines to indicate internal components that are not generally visible to a user of the mobile device 502. In a particular example, the audio processor 106 is configured to, responsive to user instructions (e.g., received via a graphical user interface at the display screen 504), initiate in-call music delivery during a voice call and to align the active periods of voice and audio processing for the in-call music delivery with call timing criteria to enable low-power operation (e.g., to support the low power island state 214) during the voice call.

Figure 6:
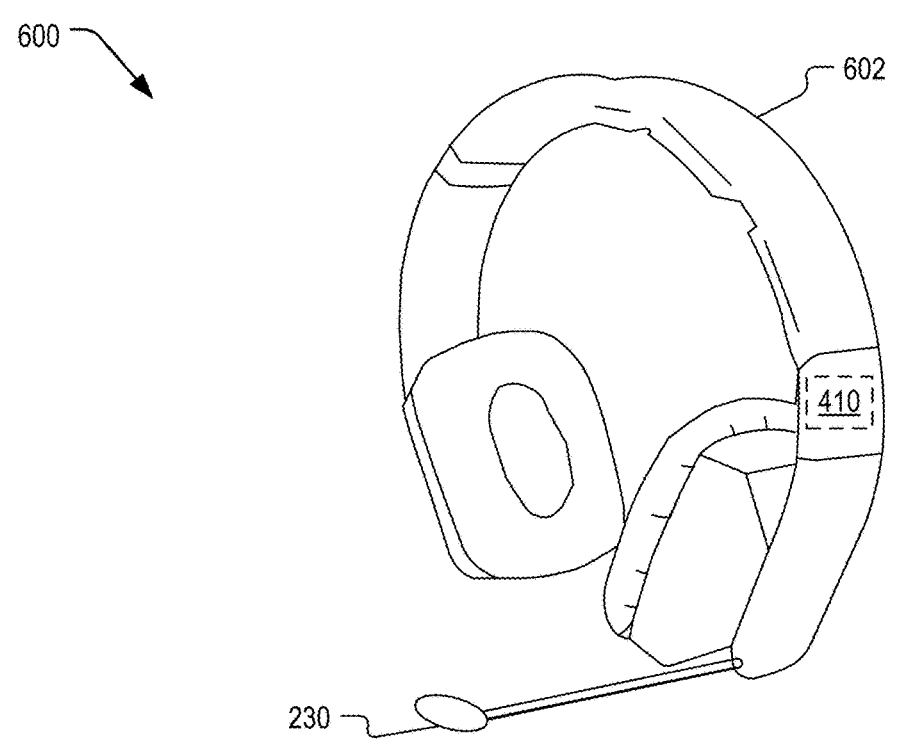
FIG. 6 is a diagram of a headset operable to process voice and other audio for concurrent playout during a voice call, in accordance with some examples of the present disclosure.

FIG. 6 depicts an implementation 600 in which the device 102 includes a headset device 602. The headset device 602 includes the microphone 230, and the one or more processors 410 including the audio processor 106 are integrated in the headset device 602. In a particular example, the audio processor 106 is configured to, responsive to user instructions (e.g., received via one or more user controls of the headset device 602, or via a speech interface, as non-limiting examples), initiate in-call music delivery during a voice call and to align the active periods of voice and audio processing for the in-call music delivery with call timing criteria to enable low-power operation (e.g., to support the low power island state 214) during the voice call. Although illustrated as an audio headset, in other implementations the headset device 602 can correspond to an extended reality headset, such as a virtual reality, mixed reality, or augmented reality headset.

Figure 7:
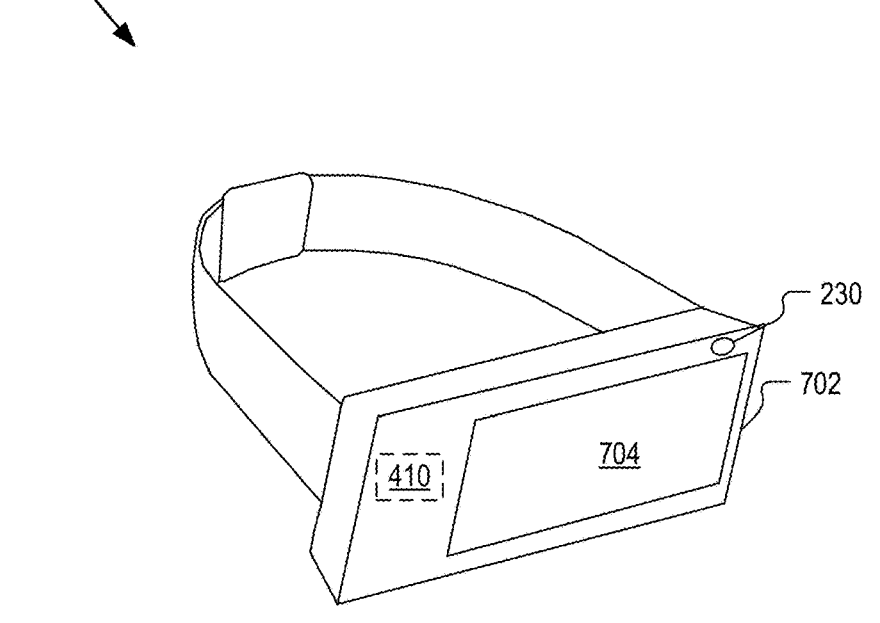
FIG. 7 is a diagram of a wearable electronic device operable to process voice and other audio for concurrent playout during a voice call, in accordance with some examples of the present disclosure.

FIG. 7 depicts an implementation 700 in which the device 102 includes a wearable electronic device 702, illustrated as a "smart watch." The microphone 230 and the one or more processors 410 including the audio processor 106 are integrated into the wearable electronic device 702. In a particular example, the audio processor 106 is configured to, responsive to user instructions, such as via a graphical user interface at a display screen 704 of the wearable electronic device 702, initiate in-call music delivery during a voice call and to align the active periods of voice and audio processing for the in-call music delivery with call timing criteria to enable low-power operation (e.g., to support the low power island state 214) during the voice call. In a particular example, the wearable electronic device 702 includes a haptic device that provides a haptic notification (e.g., vibrates) in response to detection of an incoming call during which the user can initiate in-call music delivery. For example, the haptic notification can cause a user to look at the display screen 704 of the wearable electronic device 702 to see a displayed notification indicating an incoming call while the user is playing music at the wearable electronic device 702, including a prompt to share the music during the call with the calling party by continuing the music playback via in-call music delivery while the call is ongoing. The wearable electronic device 702 can thus alert a user of the option to perform in-call music delivery.

FIG. 8 is an implementation 800 in which the device 102 includes a wireless speaker and voice activated device 802. The wireless speaker and voice activated device 802 can have wireless network connectivity and is configured to execute an assistant operation. The microphone 230 and the one or more processors 410 including the audio processor 106 are included in the wireless speaker and voice activated device 802. The wireless speaker and voice activated device 802 also includes a speaker 842 and supports use of a wireless headset, illustrated as a pair of in-ear earphones 890, which can optionally be used by a user for music playback and/or participating in voice calls via the wireless speaker and voice activated device 802. During operation, in response to receiving a verbal command identified as user speech via the microphone 230 or via wireless signaling from the earphones 890, the wireless speaker and voice activated device 802 can execute assistant operations, such as via execution of a voice activation system (e.g., an integrated assistant application). The assistant operations can include initiating in-call music delivery during an ongoing voice call or during initiation of a voice call.

FIG. 9 depicts an implementation 900 in which the device 102 corresponds to, or is integrated within, a vehicle 902, illustrated as a car. The vehicle 902 includes the one or more processors 410 including the audio processor 106. The vehicle 902 also includes microphones 230 positioned to capture utterances of an operator and/or one or more users of the vehicle 902. User voice activity detection can be performed based on audio signals received from the microphones 230, including one or more user commands to initiate in-call music delivery during an ongoing voice call, in response to accepting an incoming voice call, or during initiation of a voice call. For example, when an incoming voice call is detected while a user of the vehicle 902 is listening to music playing out at one or more speakers 942, the user may be prompted via a display 946 or via the one or more speakers 942 if the user would like to share the music during the call with the calling party by continuing music playback via in-call music delivery while the call is ongoing.

Referring to FIG. 10, a particular implementation of a method 1000 of processing voice and other audio for concurrent playout during a voice call is shown. In a particular aspect, one or more operations of the method 1000 are performed by at least one of the audio processor 106, the modem 150, or the device 102 of FIG. 1, the shared memory 204, the shared memory 208, the circular buffer 250, the application processor 206, the central sleep manager 210, or the voice timer 220 of FIG. 2, or a combination thereof.

The method 1000 includes, at block 1002, transitioning, at an audio processor, from a low-power state to an active state during a voice call. For example, the audio processor 106 transitions from the low-power state to the active state upon entering the awake period 162A of the first cycle 158A associated with the voice call.

The method 1000 includes, responsive to transitioning to the active state, obtaining, at the audio processor, a first audio component from a first audio source, the first audio component corresponding to a user's voice data of the voice call, at block 1004, and obtaining, at the audio processor, a second audio component from a second audio source, the second audio component corresponding to additional audio, at block 1006. For example, upon entering the awake period 162A, the audio processor 106 obtains the first audio component 122 corresponding to the voice data 124 and the second audio component 132 corresponding to the additional audio 134.

The method 1000 includes, at block 1008, generating, at the audio processor, output audio for transmission during the voice call based on the first audio component and the second audio component. For example, the audio processor 106 performs mixing of the first audio component 122 and the second audio component 132 at the mixer 138 and encoding of the mixed audio data at the codec 140 to generate the output audio 142.

The method 1000 also includes, at block 1010, transitioning, at the audio processor, from the active state to the low-power state after generating the output audio. To illustrate, the audio processor 106 generates the output audio 142 during the awake period 162A of the first cycle 158A associated with the voice call, and transitions from the active state to the low-power state upon exiting the awake period 162A and entering the low-power period 164A of the first cycle 158A associated with the voice call.

In some implementations, the method 1000 also includes transmitting, at a modem, an output signal based on the output audio and corresponding to in-call music delivery (ICMD). For example, the modem 150 generates the output signal 152 based on the output audio 142 for transmission to the device 154. According to an aspect, music processing operations associated with the additional audio and voice processing operations associated with the voice data are aligned to enable synchronous processing for the ICMD using a low power island. To illustrate, the voice processing periods 172 associated with the voice processing operations 170 and music processing periods 182 associated with the music processing operations 180 are aligned so that voice processing and music processing are not performed during the low-power periods 164, enabling the central sleep manager 210 to initiate transition to the low power island state 214 during the low-power periods 164.

According to some aspects, the method 1000 also includes receiving, at the audio processor during the active state, the second audio component from an application processor via a circular buffer, instructing, during the active state, the application processor to refill the circular buffer, and refilling, by the application processor, the circular buffer during the active state. For example, the audio processor 106 can receive the second audio component 132 during an awake period 162, detect that the amount of remaining data in the circular buffer 250 is below a threshold, and send an instruction 320 (e.g., generate a watermark event) to the application processor 206 to refill the circular buffer 250. In response, the application processor 206 refills the circular buffer 250 during the same awake period 162 (or during a next awake period 162 if there is insufficient time remaining during the current awake period).

By aligning voice processing operations and music processing operations to occur during the active state, the method 1000 enables the audio processor to enter the low-power state during low-power periods associated with the sleep/wake timing criteria associated with the voice call. As a result, power consumption of the audio processor when providing ICMD is reduced as compared to conventional systems in which entry into the low-power state is prevented by music processing operations that are not aligned with voice processing operations.

The method 1000 of FIG. 10 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 1000 of FIG. 10 may be performed by a processor that executes instructions, such as described with reference to FIG. 11.

Figure 11:
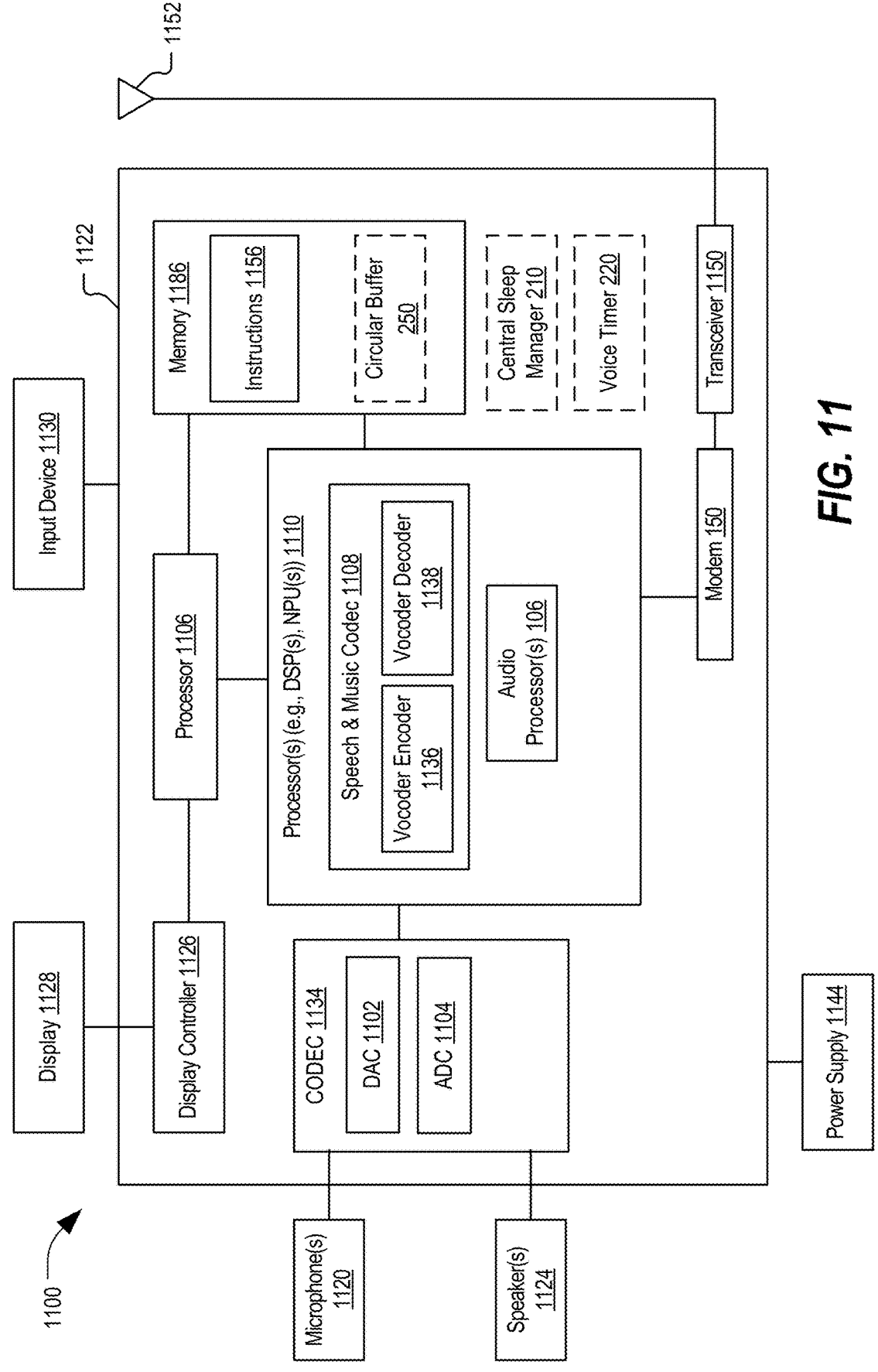
FIG. 11 is a block diagram of a particular illustrative example of a device that is operable to process voice and other audio for concurrent playout during a voice call, in accordance with some examples of the present disclosure.

Referring to FIG. 11, a block diagram of a particular illustrative implementation of a device is depicted and generally designated 1100. In various implementations, the device 1100 may have more or fewer components than illustrated in FIG. 11. In an illustrative implementation, the device 1100 may correspond to the device 102. In an illustrative implementation, the device 1100 may perform one or more operations described with reference to FIGS. 1-10.

In a particular implementation, the device 1100 includes a processor 1106 (e.g., a CPU). The device 1100 may include one or more additional processors 1110 (e.g., one or more DSPs, one or more neural processing units (NPUs), or a combination thereof). In a particular aspect, the audio processor 106 of FIG. 1 is included in or corresponds to the processors 1110, the application processor 206 is included in or corresponds to the processor 1106, or a combination thereof. The processors 1110 may include a speech and music coder-decoder (CODEC) 1108 that includes a voice coder ("vocoder") encoder 1136, a vocoder decoder 1138, or a combination thereof. In some implementations, the speech and music codec 1108 corresponds to, or is included in, the codec 140.

The device 1100 may include a memory 1186 and a CODEC 1134. The memory 1186 may include instructions 1156 that are executable by the one or more additional processors 1110 (or the processor 1106) to implement the functionality described with reference to the audio processor 106, the central sleep manager 210, the voice timer 220, the application processor 206, or any combination thereof. In some implementations, the memory 1186 may correspond to or include the shared memory 204 and include the circular buffer 250, while in other implementations the shared memory 204 is distinct from the memory 1186 and coupled to the processor 1106 and the one or more additional processors 1110. In some implementations, the memory 1186 may be accessible to the modem 150 and may correspond to or include the shared memory 208, while in other implementations the shared memory 208 is distinct from the memory 1186 and is coupled to the one or more additional processors 1110 and the modem 150. The device 1100 may include the modem 150 coupled, via a transceiver 1150, to an antenna 1152.

The device 1100 may include a display 1128 coupled to a display controller 1126. One or more speakers 1124 and one or more microphones 1120 may be coupled to the CODEC 1134. In a particular aspect, the one or more microphones 1120 include the microphone 230. The CODEC 1134 may include a digital-to-analog converter (DAC) 1102, an analog-to-digital converter (ADC) 1104, or both. In a particular implementation, the CODEC 1134 may receive analog signals from the microphone 1120, convert the analog signals to digital signals using the analog-to-digital converter 1104, and provide the digital signals to the speech and music codec 1108. According to an aspect, the digital signals corresponding to the microphone input may be mixed with additional audio, such as by the mixer 138, to generate mixed audio data that is processed by the speech and music codec 1108. In a particular implementation, the speech and music codec 1108 may provide digital signals to the CODEC 1134. The CODEC 1134 may convert the digital signals to analog signals using the digital-to-analog converter 1102 and may provide the analog signals to the speaker 1124.

In a particular implementation, the device 1100 may be included in a system-in-package or system-on-chip device 1122. In a particular implementation, the memory 1186, the processor 1106, the processors 1110, the display controller 1126, the CODEC 1134, the transceiver 1150, and the modem 150 are included in the system-in-package or system-on-chip device 1122. In a particular implementation, an input device 1130 and a power supply 1144 are coupled to the system-in-package or the system-on-chip device 1122. Moreover, in a particular implementation, as illustrated in FIG. 11, the display 1128, the input device 1130, the speaker 1124, the microphone 1120, the antenna 1152, and the power supply 1144 are external to the system-in-package or the system-on-chip device 1122. In a particular implementation, each of the display 1128, the input device 1130, the speaker 1124, the microphone 1120, the antenna 1152, and the power supply 1144 may be coupled to a component of the system-in-package or the system-on-chip device 1122, such as an interface or a controller.

The device 1100 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, a car, a computing device, a communication device, an internet-of-things (IoT) device, an extended reality (XR) device, a base station, a mobile device, or any combination thereof.

In conjunction with the described implementations, an apparatus includes means for transitioning from a low-power state to an active state during a voice call. For example, the means for transitioning from a low-power state to an active state can correspond to the audio processor 106, the device 102, the central sleep manager 210, the voice timer 220, the processor 1106, the one or more processors 1110, one or more other circuits or components configured to transition from a low-power state to an active state during a voice call, or any combination thereof.

The apparatus includes means for obtaining, from a first audio source, a first audio component corresponding to a user's voice data of the voice call responsive to transitioning to the active state. For example, the means for obtaining a first audio component corresponding to a user's voice data of the voice call can correspond to the voice session 120, the audio processor 106, the device 102, the microphone 230, the microphone 1120, the CODEC 1134, the vocoder encoder 1136, the speech and music codec 1108, the processor 1106, the one or more processors 1110, one or more other circuits or components configured to obtain, from a first audio source, a first audio component corresponding to a user's voice data of the voice call, or any combination thereof.

The apparatus includes means for obtaining, from a second audio source, a second audio component corresponding to additional audio responsive to transitioning to the active state. For example, the means for obtaining a second audio component corresponding to additional audio can correspond to the music session 130, the audio processor 106, the device 102, the application processor 206, the shared memory 204, the circular buffer 250, the vocoder encoder 1136, the speech and music codec 1108, the processor 1106, the one or more processors 1110, one or more other circuits or components configured to obtain, from a second audio source, a second audio component corresponding to additional audio responsive to transitioning to the active state, or any combination thereof.

The apparatus also includes means for generating output audio for transmission during the voice call based on the first audio component and the second audio component. For example, the means for generating output audio for transmission during the voice call can correspond to the voice session 120, the music session 130, the mixer 138, the codec 140, the audio processor 106, the device 102, the modem 150, the vocoder encoder 1136, the speech and music codec 1108, the processor 1106, the one or more processors 1110, one or more other circuits or components configured to generate output audio for transmission during the voice call based on the first audio component and the second audio component, or any combination thereof.

The apparatus also includes means for transitioning from the active state to the low-power state after generating the output audio. For example, the means for transitioning from the active state to the low-power state after generating the output audio can correspond to the audio processor 106, the device 102, the central sleep manager 210, the voice timer 220, the processor 1106, the one or more processors 1110, one or more other circuits or components configured to transition from the active state to the low-power state after generating the output audio, or any combination thereof.

In some implementations, a non-transitory computer-readable medium (e.g., a computer-readable storage device, such as the memory 1186) includes instructions (e.g., the instructions 1156) that, when executed by one or more processors (e.g., the audio processor 106, the one or more processors 1110, or the processor 1106), cause the one or more processors to, responsive to transitioning from a low-power state (e.g., the low power island state 214) to an active state (e.g., the active state 212) during a voice call, obtain, from a first audio source (e.g., the microphone 230), a first audio component (e.g., the first audio component 122) corresponding to a user's voice data (e.g., the voice data 124) of the voice call, obtain, from a second audio source (e.g., the application processor 206), a second audio component (e.g., the second audio component 132) corresponding to additional audio (e.g., the additional audio 134), and generate output audio (e.g., the output audio 142) for transmission during the voice call based on the first audio component and the second audio component. The instructions are further executable by the audio processor to, after generating the output audio, transition from the active state to the low-power state.

Particular aspects of the disclosure are described below in sets of interrelated Examples:

According to Example 1, a device comprises: an audio processor configured to, responsive to transitioning from a low-power state to an active state during a voice call: obtain, from a first audio source, a first audio component corresponding to a user's voice data of the voice call; obtain, from a second audio source, a second audio component corresponding to additional audio; and generate output audio for transmission during the voice call based on the first audio component and the second audio component. The audio processor is also configured to, after generating the output audio, transition from the active state to the low-power state.

Example 2 includes the device of Example 1, further comprising a modem configured to initiate transmission of an output signal based on the output audio.

Example 3 includes the device of Example 2, wherein the transmission of the output signal including user voice content and additional audio content corresponds to in-call music delivery (ICMD).

Example 4 includes the device of Example 3, wherein transitions between an active state and a low-power state of the modem are aligned with transitions of the audio processor between the active state and the low-power state to enable synchronized processing for the ICMD using a low power island.

Example 5 includes the device of any of Examples 1 to 4, further comprising an application processor configured to provide the additional audio to the audio processor via a shared memory.

Example 6 includes the device of Example 5, wherein the shared memory includes a circular buffer, and wherein the audio processor is configured to: obtain the second audio component from the circular buffer; and instruct the application processor to refill the circular buffer with audio data corresponding to the additional audio.

Example 7 includes the device of Example 6, wherein the audio processor is configured to send instructions to the application processor following the transitioning of the audio processor from the low-power state to the active state, wherein the application processor is configured to refill the circular buffer during the active state, and wherein transitions of the application processor between an active state and a low-power state are aligned with transitions of the audio processor between the active state and the low-power state.

Example 8 includes the device of any of Examples 1 to 7, further comprising a voice timer configured to schedule voice processing threads for the voice data and schedule audio processing threads for the additional audio according to timing criteria of the voice call.

Example 9 includes the device of Example 8, wherein the voice call is a connected mode discontinuous reception (CDRx) call, and wherein the timing criteria is based on a CDRx cycle configuration.

Example 10 includes the device of Example 8 or Example 9, wherein a central sleep manager is configured to trigger entry into a low power island state in response to detecting that the voice processing threads and the audio processing threads are idle.

Example 11 includes the device of any of Examples 1 to 10, wherein the audio processor is configured to: mix the first audio component and the second audio component to generate mixed audio data; and encode the mixed audio data to generate the output audio.

Example 12 includes the device of any of Examples 1 to 11, wherein the additional audio includes at least one of pre-recorded music or pre-recorded voice content.

Example 13 includes the device of any of Examples 1 to 12, further comprising a microphone configured to provide the voice data.

Example 14 includes the device of Example 13, wherein the audio processor is integrated in a headset device that includes the microphone.

Example 15 includes the device of any of Examples 1 to 14, wherein the audio processor is integrated in at least one of a mobile phone, a tablet computer device, or a wearable electronic device.

According to Example 16, a method comprises: transitioning, at an audio processor, from a low-power state to an active state during a voice call and, responsive to transitioning to the active state: obtaining, at the audio processor, a first audio component from a first audio source, the first audio component corresponding to a user's voice data of the voice call; obtaining, at the audio processor, a second audio component from a second audio source, the second audio component corresponding to additional audio; and generating, at the audio processor, output audio for transmission during the voice call based on the first audio component and the second audio component. The method also includes transitioning, at the audio processor, from the active state to the low-power state after generating the output audio.

Example 17 includes the method of Example 16, further comprising transmitting, at a modem, an output signal based on the output audio and corresponding to in-call music delivery (ICMD).

Example 18 includes the method of Example 17, wherein music processing operations associated with the additional audio and voice processing operations associated with the voice data are aligned to enable synchronous processing for the ICMD using a low power island.

Example 19 includes the method of Example 18, further comprising: receiving, at the audio processor during the active state, the second audio component from an application processor via a circular buffer; instructing, during the active state, the application processor to refill the circular buffer; and refilling, by the application processor, the circular buffer during the active state.

Example 20 includes the method of any of Examples 16 to 18, wherein the additional audio is provided to the audio processor by an application processor via a shared memory.

Example 21 includes the method of Example 20, wherein the shared memory includes a circular buffer, and wherein the audio processor obtains the second audio component from the circular buffer and instructs the application processor to refill the circular buffer with audio data corresponding to the additional audio.

Example 22 includes the method of Example 21, wherein the audio processor sends instructions to the application processor following the transitioning of the audio processor from the low-power state to the active state, wherein the application processor refills the circular buffer during the active state, and wherein transitions of the application processor between an active state and a low-power state are aligned with transitions of the audio processor between the active state and the low-power state.

Example 23 includes the method of any of Examples 16 to 22, further comprising scheduling voice processing threads for the voice data and scheduling audio processing threads for the additional audio according to timing criteria of the voice call.

Example 24 includes the method of Example 23, wherein the voice call is a connected mode discontinuous reception (CDRx) call, and wherein the timing criteria is based on a CDRx cycle configuration.

Example 25 includes the method of Example 23 or Example 24, wherein entry into a low power island state is triggered in response to detecting that the voice processing threads and the audio processing threads are idle.

Example 26 includes the method of any of Examples 16 to 25, wherein generating the output signal includes: mixing the first audio component and the second audio component to generate mixed audio data; and encoding the mixed audio data.

Example 27 includes the method of any of Examples 16 to 26, wherein the additional audio includes at least one of pre-recorded music or pre-recorded voice content.

Example 28 includes the method of any of Examples 16 to 27, wherein the voice data is received from a microphone.

According to Example 29, a device includes: a memory configured to store instructions; and a processor configured to execute the instructions to perform the method of any of Examples 16 to 28.

According to Example 30, a non-transitory computer-readable medium stores instructions that, when executed by a processor, cause the processor to perform the method of any of Examples 16 to 28.

According to Example 31, an apparatus includes means for carrying out the method of any of Examples 16 to 28.

According to Example 32, a non-transitory computer readable medium storing instructions that, when executed by an audio processor, cause the audio processor to: responsive to transitioning from a low-power state to an active state during a voice call: obtain, from a first audio source, a first audio component corresponding to a user's voice data of the call; obtain, from a second audio source, a second audio component corresponding to additional audio; and generate output audio for transmission during the voice call based on the first audio component and the second audio component. The instructions, when executed by the audio processor, also cause the audio processor to, after generating the output audio, transition from the active state to the low-power state.

According to Example 33, an apparatus comprises: means for transitioning from a low-power state to an active state during a voice call; means for obtaining, from a first audio source, a first audio component corresponding to a user's voice data of the call responsive to transitioning to the active state; means for obtaining, from a second audio source, a second audio component corresponding to additional audio responsive to transitioning to the active state; means for generating output audio for transmission during the voice call based on the first audio component and the second audio component; and means for transitioning from the active state to the low-power state after generating the output audio.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:
   an audio processor configured to:
      transition, based on timing criteria associated with a voice call, from a low-power state to an active state concurrently with a corresponding transition of a modem;
      responsive to the transition from the low-power state to the active state during the voice call and during the active state:
         obtain, from a first audio source, a first audio component corresponding to a user's voice data of the voice call;
         obtain, from a second audio source, a second audio component corresponding to additional audio; and
         generate output audio for transmission during the voice call based on the first audio component and the second audio component; and
      after the generation of the output audio, transition from the active state to the low-power state.

2. The device of claim 1, further comprising the modem configured to initiate transmission of an output signal based on the output audio.

3. The device of claim 2, wherein the transmission of the output signal including user voice content and additional audio content corresponds to in-call music delivery (ICMD).

4. The device of claim 1, wherein transitions between an active state and a low-power state of the modem are aligned with transitions of the audio processor between the active state and the low-power state to enable synchronized processing for in-call music delivery (ICMD) using a low power island.

5. The device of claim 1, further comprising an application processor configured to provide the additional audio to the audio processor via a shared memory.

6. The device of claim 5, wherein the shared memory includes a circular buffer, and wherein the audio processor is configured to:
   obtain the second audio component from the circular buffer; and
   instruct the application processor to refill the circular buffer with audio data corresponding to the additional audio.

7. The device of claim 6, wherein the audio processor is configured to send instructions to the application processor following the transition of the audio processor from the low-power state to the active state, wherein the application processor is configured to refill the circular buffer during the active state, and wherein transitions of the application processor between an active state and a low-power state are aligned with transitions of the audio processor between the active state and the low-power state.

8. The device of claim 1, further comprising a voice timer configured to schedule voice processing threads for the voice data and schedule audio processing threads for the additional audio according to timing criteria of the voice call.

9. The device of claim 8, wherein the voice call is a connected mode discontinuous reception (CDRx) call, and wherein the timing criteria is based on a CDRx cycle configuration.

10. The device of claim 8, further comprising a central sleep manager, wherein the central sleep manager is configured to trigger entry into a low power island state in response to detection that the voice processing threads and the audio processing threads are idle.

11. The device of claim 1, wherein the audio processor is configured to:
   mix the first audio component and the second audio component to generate mixed audio data; and
   encode the mixed audio data to generate the output audio.

12. The device of claim 1, wherein the additional audio includes at least one of pre-recorded music or pre-recorded voice content.

13. The device of claim 1, further comprising a microphone configured to provide the voice data.

14. The device of claim 13, wherein the audio processor is integrated in a headset device that includes the microphone.

15. The device of claim 1, wherein the audio processor is integrated in at least one of a mobile phone, a tablet computer device, or a wearable electronic device.

16. A method comprising:
   transitioning, at an audio processor and based on timing criteria associated with a voice call, from a low-power state to an active state during the voice call, concurrently with a corresponding transition of a modem, and, responsive to transitioning to the active state and during the active state:
      obtaining, at the audio processor, a first audio component from a first audio source, the first audio component corresponding to a user's voice data of the voice call;
      obtaining, at the audio processor, a second audio component from a second audio source, the second audio component corresponding to additional audio; and generating, at the audio processor, output audio for transmission during the voice call based on the first audio component and the second audio component; and transitioning, at the audio processor, from the active state to the low-power state after generating the output audio.

17. The method of claim 16, further comprising transmitting, at the modem, an output signal based on the output audio and corresponding to in-call music delivery (ICMD).

18. The method of claim 17, wherein music processing operations associated with the additional audio and voice processing operations associated with the voice data are aligned to enable synchronous processing for the ICMD using a low power island.

19. The method of claim 18, further comprising:

receiving, at the audio processor during the active state, the second audio component from an application processor via a circular buffer;

instructing, during the active state, the application processor to refill the circular buffer; and refilling, by the application processor, the circular buffer during the active state.

20. A non-transitory computer readable medium storing instructions that, when executed by an audio processor, cause the audio processor to:

transition, based on timing criteria associated with a voice call, from a low-power state to an active state concurrently with a corresponding transition of a modem;

responsive to the transition from the low-power state to the active state during the voice call and during the active state:

obtain, from a first audio source, a first audio component corresponding to a user's voice data of the voice call;

obtain, from a second audio source, a second audio component corresponding to additional audio; and generate output audio for transmission during the voice call based on the first audio component and the second audio component; and after the generation of the output audio, transition from the active state to the low-power state.

* * * * *